(12) United States Patent
Yu-Chin

(10) Patent No.: US 6,504,998 B1
(45) Date of Patent: Jan. 7, 2003

(54) STRUCTURE OF TEMPERATURE-SENSING TUBE FOR AQUARIUM

(75) Inventor: Wang Yu-Chin, Taipei (TW)

(73) Assignee: Eike Electric Products Corp., Taipei (TW)

( * ) Notice: Subject to any disclaimer, the term of this patent is extended or adjusted under 35 U.S.C. 154(b) by 0 days.

(21) Appl. No.: 10/066,593

(22) Filed: Feb. 6, 2002

(51) Int. Cl.⁷ .................................................. H05B 3/40
(52) U.S. Cl. ...................................... 392/497; 219/490
(58) Field of Search .............................. 392/497, 498, 392/503, 501; 219/501, 507, 490

(56) References Cited

U.S. PATENT DOCUMENTS 5,568,587 A * 10/1996 Marioni ...................... 219/523
6,097,007 A * 8/2000 Wang .......................... 219/497
6,118,934 A * 9/2000 Tseng .......................... 219/481

* cited by examiner

Primary Examiner—Teresa Walberg
Assistant Examiner—Thor Campbell
(74) Attorney, Agent, or Firm—Troxell Law Office PLLC

(57) ABSTRACT

An improved temperature-sensing tube for an aquarium, includes a temperature-sensing tube, one end of a temperature sensitive switch made from two metal sheets if welded to a heat-sinking piece, the main body of the heat-sinking piece is formed coincident with the shape of and is completely kept close to the inner wall of the outer pipe. Abnormal temperature generated by the running of related members in the electric circuit board is transmitted to the heat sink. Thus, the whole temperature-sensing device can be more accurate and reliable with more economical cost.

2 Claims, 4 Drawing Sheets

STRUCTURE OF TEMPERATURE-SENSING TUBE FOR AQUARIUM

BACKGROUND OF THE INVENTION

1. Field of the Invention

The present invention relates to an improved structure of a temperature-sensing tube for an aquarium, and especially to a structure in which influence on the accuracy of temperature sensing by noises generated by the interior electric circuit elements of the temperature-sensing tube can be prevented by means of connecting and heat sinking through an interior temperature sensitive switch.

2. Description of the Prior Art

Water temperature in an aquarium can be changed by influence of ambient weather (such as hot summertime or cold winter). Therefore, for control of the temperature in the aquarium, a temperature-sensing tube with a heating device therein has to be used to assure that cultivated fishes can survive in the aquarium.

Although maintaining the water temperature is useful, when cultivating different fishes in an aquarium, different temperatures may be used. For example, fresh-water fishes shall be cultivated in an aquarium with a higher temperature; while deep-water fishes shall be cultivated n an aquarium with a lower temperature. Hence, a normal temperature-sensing tube includes an electric heating device capable of generating a specific temperature to adjust the water temperature. Such a temperature-sensing tube is provided with related members, such as an electric circuit board, a temperature-sensing element, and a temperature sensitive switch. However, such a conventional temperature-sensing device is subject to influence of the temperature generated by operation of the electric circuit board and other elements to result inaccuracy of sensing. For example, if the temperature set originally is 15° C., a temperature-sensing tube may have the temperature sensitive switch turn off when water temperature reaches 12° C., resulting in undesirable inaccuracy of sensing.

U.S. Pat. No. 6,097,007 titled "Aquarium water temperature controller" has solved such trouble of inaccuracy of sensing of a temperature-sensing tube. The known device has a thyristor activated or turned off in different potentials by way of connecting a bridge circuit having a heat sensitive resistance with a comparator, as well as of triggering an analog circuit by a bias voltage generating circuit, thereby water temperature can be more accurately sensed. However, such a design makes the related electric circuits of the whole temperature-sensing tube complicated, and makes the cost of production high.

SUMMARY OF THE INVENTION

The object of the present invention is to provide an improved structure of a temperature-sensing tube for an aquarium, wherein, a heat-sinking piece is welded to a temperature-sensing switch, the heat-sinking piece preferably being coincident with the shape of, and kept close to the inner wall of a temperature-sensing tube, so that it can transmit the temperature generated by the temperature-sensing switch to the wall of an outer pipe to contact the water in the aquarium, to thereby prevent probably error of temperature sensing. Therefore, a more accurate temperature sensing function can be obtained with more economical cost.

The present invention will be apparent in its novelty and other features after reading the detailed description of the preferred embodiment thereof in reference to the accompanying drawings.

DETAILED DESCRIPTION OF THE PREFERRED EMBODIMENT

Figure 1:
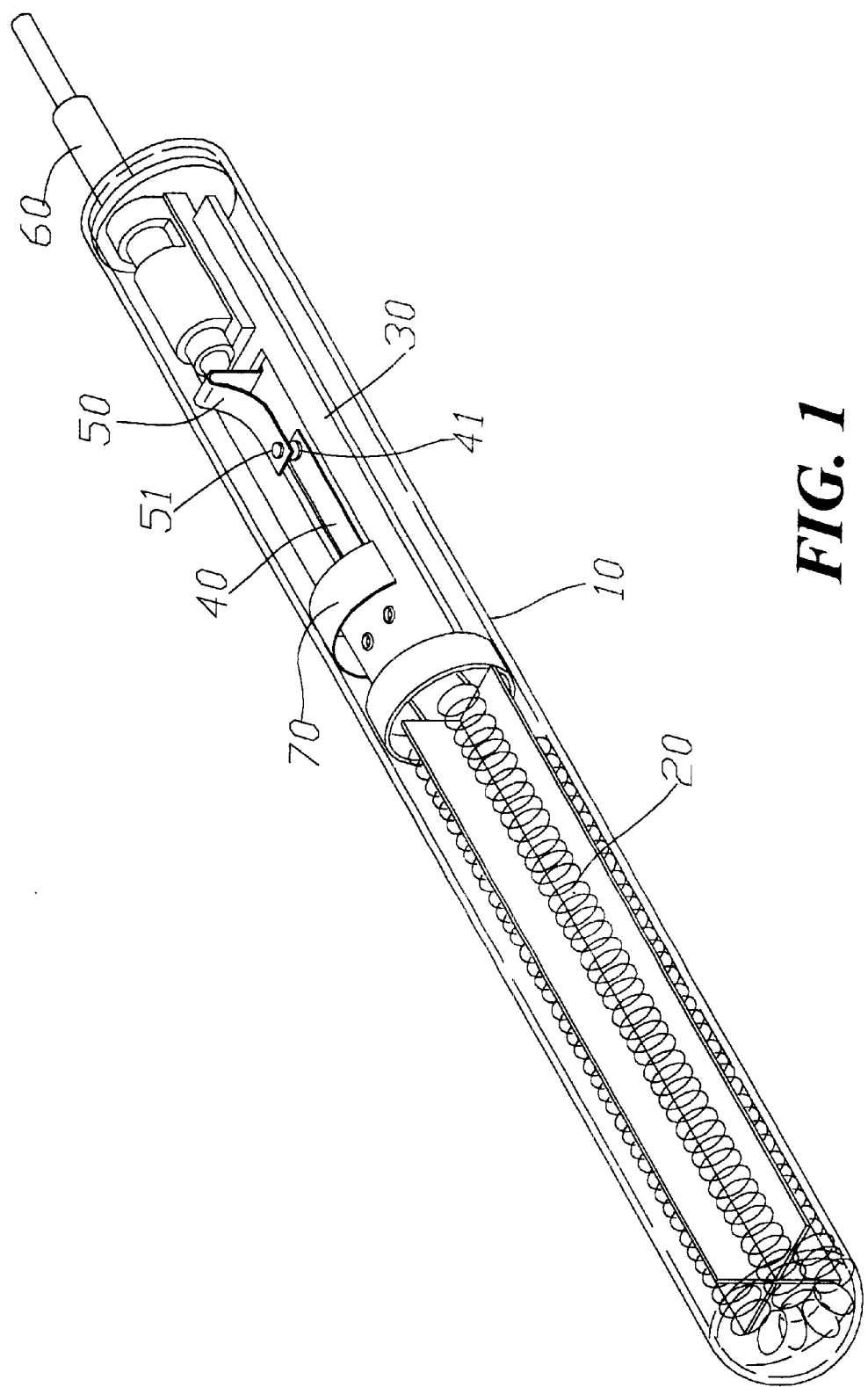
FIG. 1 is a perspective view showing a preferred embodiment of the present invention.
Figure 2:
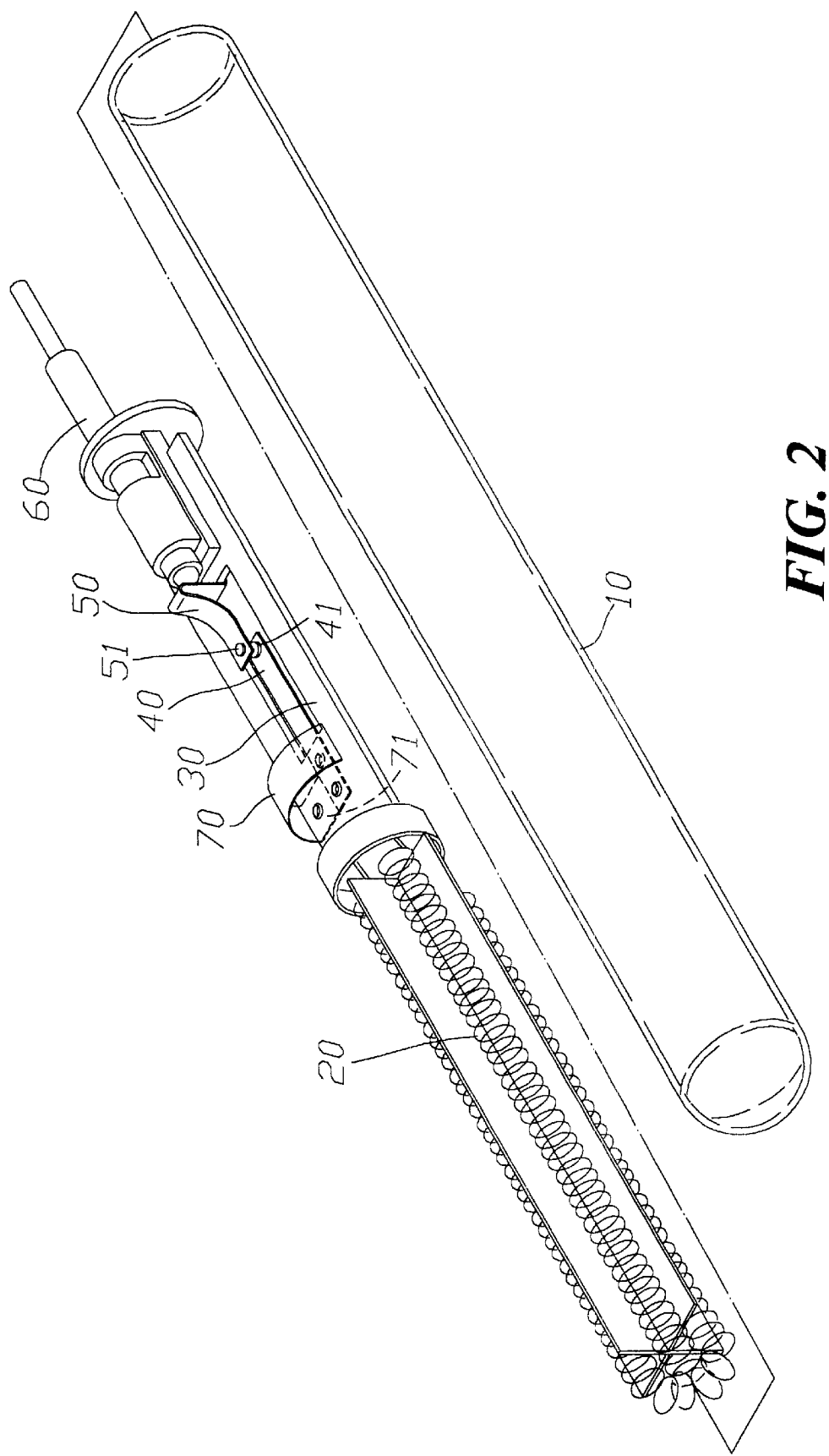
FIG. 2 is an analytic perspective view showing the elements in the outer pipe of FIG. 1.

Referring to FIGS. 1 and 2, the present invention has an outer pipe 10 with a specific length, the outer pipe 10 is generally made of glass, and is provided therein with the main elements including an electric heating coil 20, an electric circuit board 30, a temperature sensitive switch 40, a spring-sheet switch member 50 and an adjusting member 60 partially exposed to the outside of the outer pipe 10.

Figures 3, 4:
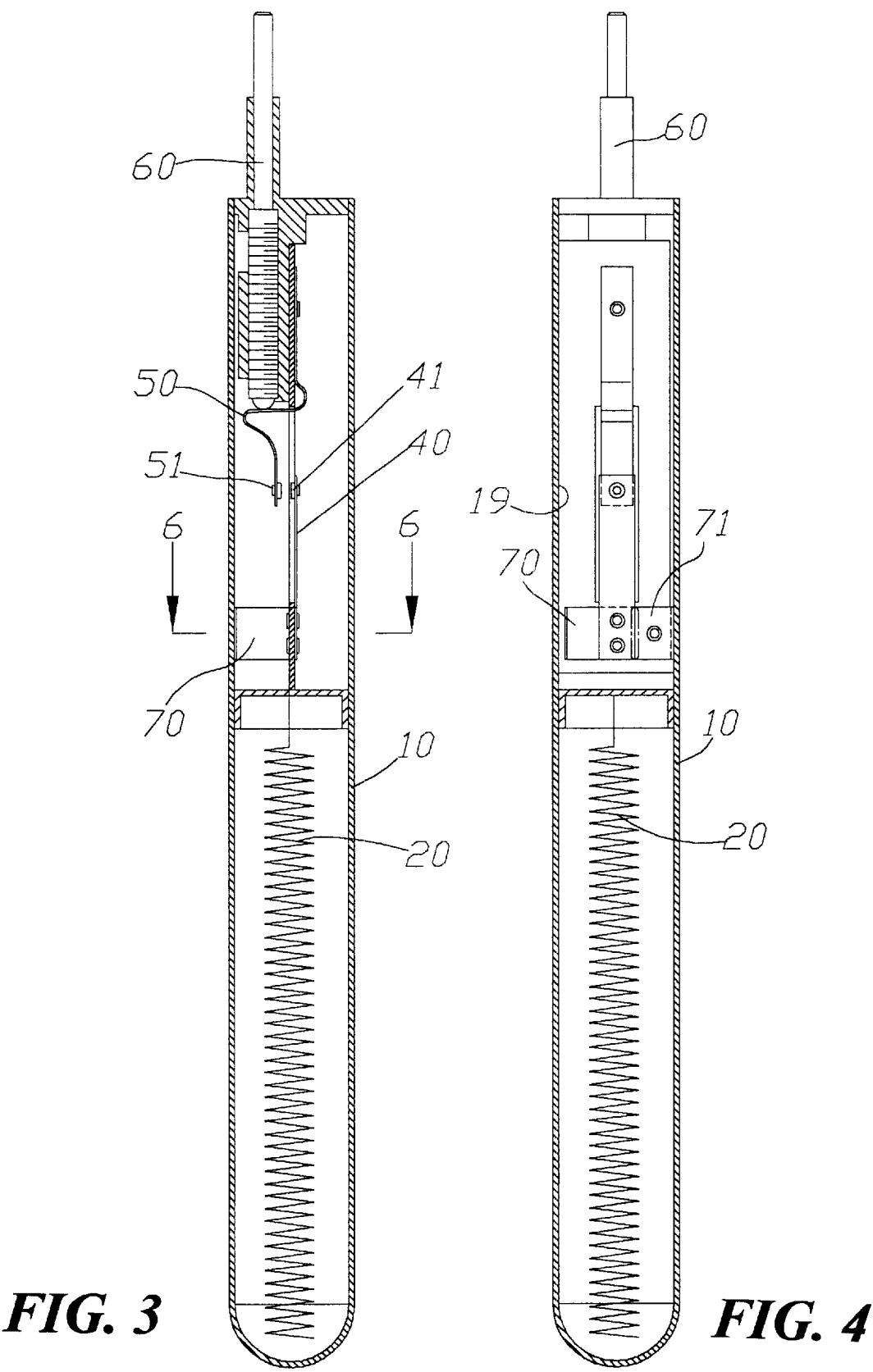
FIG. 3 is a sectional view taken from FIG. 1.
FIG. 4 is a sectional view like FIG. 3 but viewing from another viewing angle in FIG. 1.

Adjustment and setting of the temperature of such a temperature-sensing tube is done mainly by rotating the adjusting member 60 to vary the distance between two ends 41, 51 of the temperature sensitive switch 40 and the spring-sheet switch member 50 to vary the set water temperature. As shown in FIGS. 3 and 4, when the adjusting member 60 is rotated to a deeper position, the spring-sheet switch member 50 is pressed down to reduce the distance between the two ends 41, 51. On the contrary, if the adjusting member 60 is rotated to retract, the spring-sheet switch member 50 is retracted also, and the distance between the two ends 41, 51 is increased. In this mode, the required water temperature can be controlled.

The temperature sensitive switch 40 is generally made from two metal sheets of different expansion coefficients such that, when they reach a predetermined temperature, the entire temperature sensitive switch 40 is bent by the raising of the temperature, bringing the two ends 41, 51 into contact to stop further raising of the temperature of the electric heating coil 20. Thereby, when the distance between the two ends 41, 51 is smaller, raising of temperature of the electric heating coil 20 will be stopped in a shorter time, and the adjusted water temperature will be lower. On the contrary, if the distance between the two ends 41, 51 is larger, the time of temperature raising of the electric heating coil 20 will be longer, and the adjusted water temperature will be higher.

Figure 6:
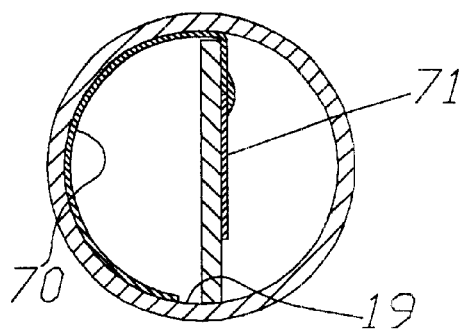
FIG. 6 is a sectional view taken from a section line 6—6 in FIG. 3.
Figure 5:
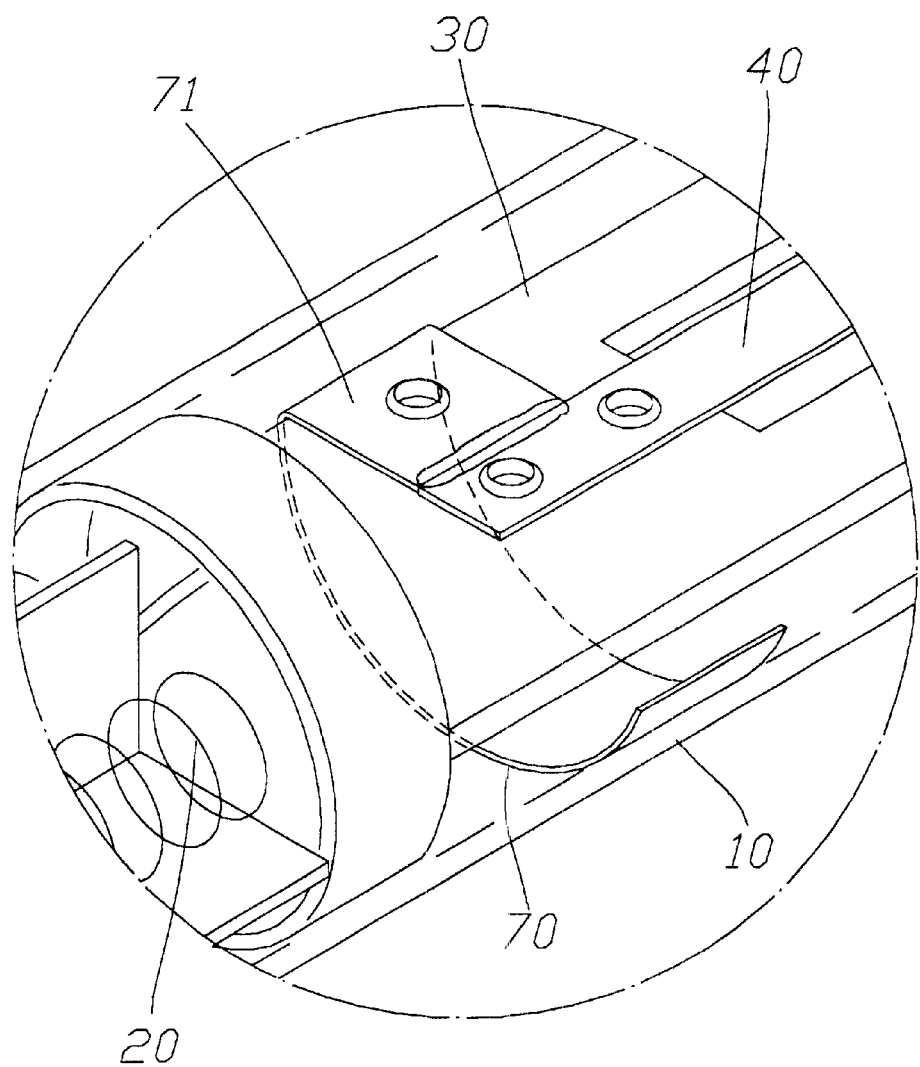
FIG. 5 is an enlarged drawing taken from FIG. 1.

The present invention is characterized by that, one end of the temperature sensitive switch 40 made of the two metal sheets is welded to a heat-sinking piece 70, as is shown in FIGS. 5 and 6. In this preferred embodiment, the heat-sinking piece 70 is welded to the temperature sensitive switch 40 with its horizontal folded edge 71, and the main body thereof is formed coincident with the shape of, and is completely kept close to, the inner wall 19 of the outer pipe 10.

With the above stated improved structure, abnormal temperature generated by the running of related members, such as the electric circuit board 30, is transmitted to the heat-sinking piece 70 through the temperature sensitive switch 40. By the fact that the main body of the heat-sinking piece 70 contacts the outer pipe 10 in the aquarium, the abnormal temperature generated in the outer pipe 10 can be lowered by such transmission. Thereby, the whole temperature-sensing device can be more accurate and reliable.

For a better effect of heat sinking, the area where the main body of the heat-sinking piece 70 is connected with the inner wall 19 of the outer pipe 10 is provided with heat conductive glue to increase its function of heat sinking.

The present invention makes the temperature-sensing device of the temperature-sensing tube in the aquarium operate more accurately; it is novel and industrially valuable.

Having now particularly described and ascertained the nature of the present invention and in what manner the same is to be performed, we declare that what we claim are:

1. A temperature-sensing tube for an aquarium, said temperature-sensing tube comprising: an outer pipe provided therein with an electric heating coil, an electric circuit board, a temperature sensitive switch, a spring-sheet switch member and an adjusting member partially exposed out of said outer pipe, whereby said adjusting member is rotated to adjust a distance between two ends, a first end on said temperature sensitive switch, and a second end on said spring-sheet switch member for setting of a desired temperature, one end of said temperature sensitive switch is welded to a heat-sinking piece including a main body formed coincident with a shape of, and is completely kept close to, an inner wall of said outer pipe to transmit and sink heat generated in operation, wherein said heat-sinking piece is welded to a horizontal folded edge of said temperature sensitive switch.

2. The temperature-sensing tube for an aquarium as claimed in claim 1, wherein, said main body of said heat-sinking piece is connected with said inner wall of said outer pipe with heat conductive glue.

* * * * *

UNITED STATES PATENT AND TRADEMARK OFFICE
CERTIFICATE OF CORRECTION

PATENT NO.   : 6,504,998 B1
DATED        : January 7, 2003
INVENTOR(S)  : Yu-Chin Wang It is certified that error appears in the above-identified patent and that said Letters Patent is hereby corrected as shown below:

<u>Title page,</u>
Item [73], should read as follows:
-- [73] Assignee: Eiko Electric Products Corp. Taipei (TW) --

Signed and Sealed this

Twelfth Day of August, 2003

JAMES E. ROGAN
*Director of the United States Patent and Trademark Office*